United States Patent [19]

Lucas

[11] 4,124,166
[45] Nov. 7, 1978

[54] SPREADING TANK

[75] Inventor: Gustave Lucas, La Verrie, France

[73] Assignee: Lucas G. S.A., La Verrie, France

[21] Appl. No.: 750,139

[22] Filed: Dec. 13, 1976

[30] Foreign Application Priority Data

Dec. 15, 1975 [FR] France .................................. 75 39604
Mar. 5, 1976 [FR] France .................................. 76 07045

[51] Int. Cl.² ............................................ A01C 23/00
[52] U.S. Cl. ................................... 239/662; 239/675;
239/676; 239/680
[58] Field of Search ............... 239/127, 142, 172, 662,
239/666, 670, 672, 675, 676, 679, 680

[56] References Cited

U.S. PATENT DOCUMENTS

| 2,511,514 | 6/1950 | Rosselot | 239/675 X |
| 2,645,500 | 7/1953 | Moss | 239/672 X |
| 2,956,809 | 10/1960 | Huddle et al. | 239/666 |
| 3,095,202 | 6/1963 | Kucera | 239/679 X |
| 3,396,912 | 8/1968 | Sahlstrom | 239/142 X |
| 3,420,452 | 1/1969 | Vaughan | 239/675 X |
| 3,870,202 | 3/1975 | Skibbe et al. | 239/680 X |

FOREIGN PATENT DOCUMENTS 1,205,135 9/1970 United Kingdom .................... 239/672

*Primary Examiner*—John J. Love
*Attorney, Agent, or Firm*—Melville, Strasser, Foster & Hoffman

[57] ABSTRACT

A transportable tank is disclosed for use as a manure spreader or for distributing foodstuff for livestock in a cattle barn. The tank is adapted to be towed by a tractor and connected the tractor power takeoff through a chain and sprocket arrangement. Shallow conveyor screws are provided on the bottom of the tank and carry the substance therein to the front or rear depending on their direction of rotation. A circular plate is fixed to a hollow shaft connected to the chain and sprocket arrangement and has a plurality of ejection fan blades. Several toothed shredding rotors are disposed radially and mounted for rotation about their respective axes and orbitally about the axis of the circular plate. A planetary gear system with a fixed sun gear is arranged between the rotors and the hollow shaft. The circular plate with its fan blades and the rotors are accommodated in a cylindrical drum mounted about its periphery on rollers. One of the rollers is operable to bring an opening in the side wall of the drum into position so that the fan blades are in selective communication with a closed mixing circuit in the tank for recycling the substance or with the exterior for discharging the substance once it has the desired consistency.

18 Claims, 6 Drawing Figures

SPREADING TANK

The present invention relates to a transportable tank or tank vehicle for farm use in distributing substances.

The present invention relates more particularly to tank trailers and wagons which are wholly or partly supported to tractors, adapted to tractors and used for distributing feed for cattle in troughs as well as for spreading manure, liquid manure, mineral complements and fertilizers on fields.

In cattle sheds or barns it is well known to dispense foodstuff comprising forage mixed with meal or other complements along a lateral strip or feedway parallel to the service passages for stalls. Further, present-day manure spreading devices comprise a set of rotors with horizontal axes, known as toothed cylinders, arranged transversely at the rear of a tank wagon or tank trailer. The rotors, supplied by a conveyor belt, a chain conveyor or link conveyor, shreads and sprays the manure on a strip limited to the width of the vehicle thereby necessitating a certain number of passes to cover the ground on which the manure is to be spread. The transmission means between the various mechanisms and the tractor is considerable. Also, the displacement of the load in the tank towards the rear by means of a pushing device is detrimental to the balance of the tractor coupling or towing attachment.

The tank wagon according to the invention allows the discharge of substances from any height, to the right or left in forward or reverse motion, which discharge may also be effected to the front or the rear of the tank wagon. Another aim of the present invention consists in the continuous mixing of substances in the tank as it proceeds to the discharge site. Thus the combined equipment of the tank wagon makes it possible to dispense a cattle feed mixture which may be composed of expanded silage to which meal or mineral complements have been added, or to spread manure or fertilizer on the soil.

According to the invention there is provided a tank wagon comprising a tank, a frame for the tank which may be provided with wheels or have coupling means for a tractor when it is of the wholly or partly supported type. The longitudinal sides of the tank converge at its lower end toward the longitudinal median plane of the tank wagon in the operating zone of two or more parallel conveyor screws which are capable of conveying in their direction of rotation the substance to the front or rear of the tank. In the first case the substance is shredded and expanded by at least two rotors disposed on a circular plate located forwardly at the front of the tank and rotatable about a horizontal axis, which plate comprises a series of fan blades providing a flow of air necessary to eject the substance either into a recycling duct so as to ensure sufficient cycling of the substance to obtain a homogeneous mixture or a desired degree of fineness, or directly out of the tank wagon by means of lateral deflectors through an opening formed in an orientable drum. The rotors provided on the plate are arranged radially and are driven for rotation about their respective axes while orbiting around the horizontal axis of the plate which is made possible by means of a planetary bevel gear system with its case fixed to the plate. The unit including the circular plate, fan blades and rotors revolves in a fixed or rotatable cylindrical drum, side wall of which comprises an opening for ejecting the substance according to either of the previously mentioned possibilities, the opening being positioned, as desired, by rotating the drum which is supported at several locations by roller bearings.

The accompanying drawings illustrates, by way of example, embodiments of the tank wagon according to the present invention wherein.

Figure 1:
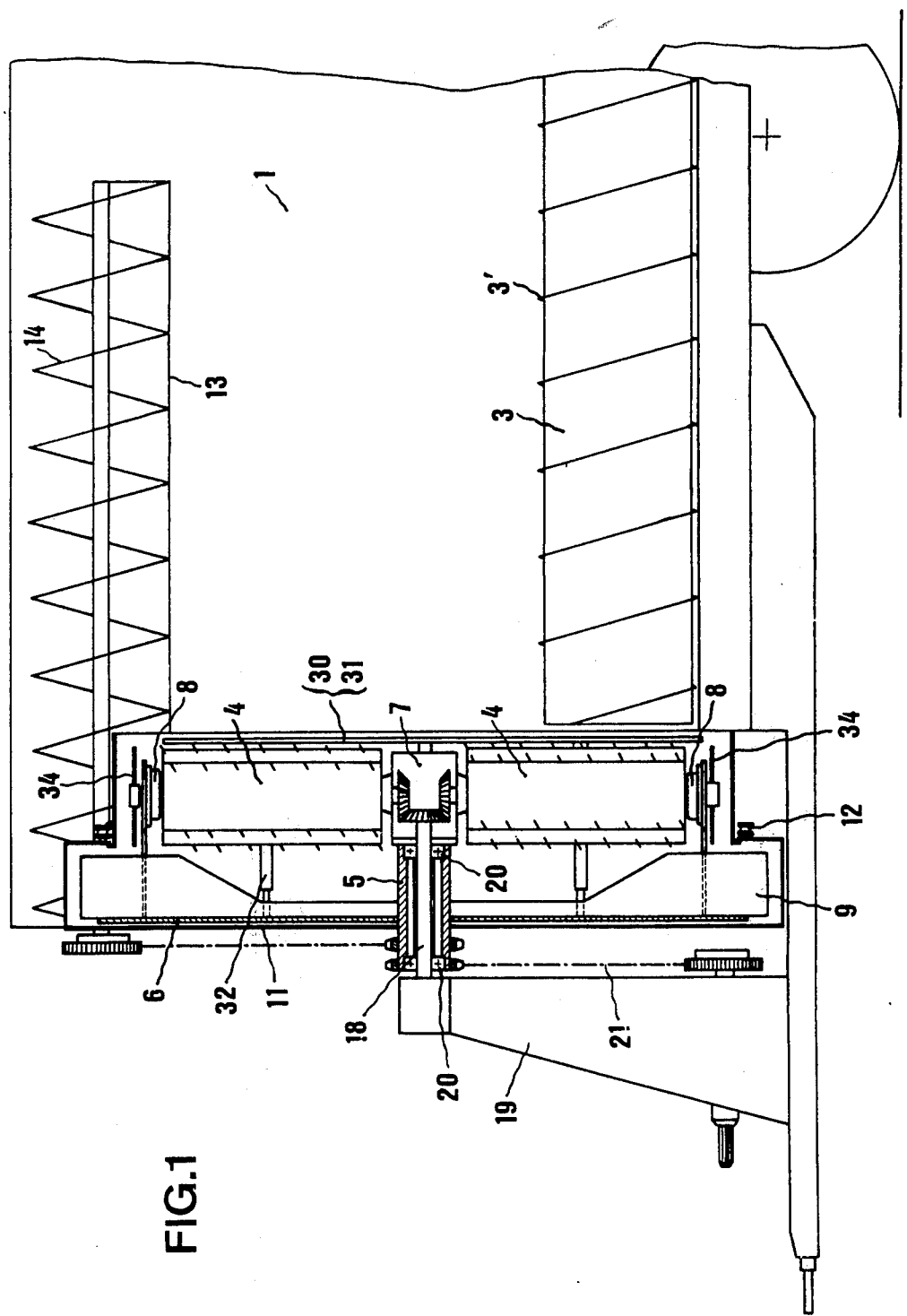
FIG. 1 is a partial longitudinal sectional view of the tank wagon.

As illustrated in the embodiment of FIGS. 1–4, the tank wagon or trailer comprises a tank 1 mounted on a frame provided with wheels and a coupling beam or towing attachment for a farm tractor: the bottom of the tank comprises two inclined lateral sides 2a and 2b converging toward the longitudinal median plane of the tank wagon or trailer so as to form at the lower part of the tank a kind of hopper shaped portion in which operate two horizontal cylinders 3 with flat helical strips 3' welded thereto. The width of the flat strip 3' from the outer surface of the cylinders 3 is small relative to the diameter of the cylinders in order to avoid the clogging of the substance thereabout. Such clogging of the substance would occur if an Archimedean screw were used instead of the cylinders 3. The rotation of the cylinders 3 carries the substance to the front or rear of the tank depending on the direction of rotation. In the first case the substance is taken over by two shreading or disentangler rotors 4 diametrically disposed on the hollow driving shaft 5 for a circular plate 6 by means of a planetary bevel gear system with its case 7 welded to the hollow shaft. The circular plate 6 is disposed forwardly in a front plane of the tank, the hollow shaft 5 being horizontal and lying in the longitudinal median plane of the tank wagon. Each end of the rotor is supported by a bearing 8 fixed to the circular plate 6. Fixed or pivotally mounted radial ejection fan blades 9 are also disposed on the plate 6, which fan blades are adapted to produce a flow of air for ejecting the substance through an opening 10 formed in the side wall of the cylindrical drum 11 having an end wall. The drum is mounted concentric of the shaft 5 by means of three cylindrical roller bearings 12 whose axes are parallel to the shaft 5. One of the rollers 12 may be a driven roller operable by any suitable means such as a crank, for example, which may be turned by the operator on the tractor to position the opening 10 in the drum 11 so that the substance is ejected into a recycling duct 13 in closed circuit with the tank disposed in the top part of the vertical sides of the tank. An Archimedes conveyor screw 14 carries the substance to the opposed, rear end of the tank and receives the substance from the cylinders 3 for another cycle and so on until there is obtained the desired shredding and expansion or a complete homogeneization of the mixture of the constituents of the animal feed. The substance ejected into the recycling duct 13 is channeled by means of an arched or curved deflector 15, for example, located in the top part of the tank. This mode of operation applies to the dispensing of silage such as forage or beets on specially equipped areas in front of the stalls in the cattle shed or barn.

The opening 10 in the side wall of the drum may also be located so that the substance can be ejected laterally, to the right or to the left, by means of folding deflectors 16 and 17 which, depending on their position, determine the spreading width of the substance on the ground.

This mode of operation enables, inter alia, the spreading of manure on fields.

The hollow shaft 5 is rotatably driven about a solid central shaft 18 fixed against rotation in a fixed support 19 welded on a support connected to the frame of the tank wagon or trailer, the shaft 18 coincides with the axis connected to a fixed sun gear of the bevel gear system having its case fixed to the circular plate 6. The hollow shaft 5 is journaled on two ball bearings 20 mounted on the frame of the tank and on the tank itself. The plate 6 is rotatably driven by a power takeoff shaft of a tractor through a chain and sprocket transmission arrangement 21. The rotation of the plate 6 imparts to the rotors 4, situated on shafts fixed respectively to the planet gears of the bevel gear system, rotational movement about their axes.

The two horizontal cylinders 3, rotatably driven by any suitable means such as a ratchet wheel with direction reversal for intermittent operation of a speed variator for continuous operation, are housed, as close as possible, in sealed recesses formed in the bottom of the tank by a central wall or a beam of hollow triangular section so as to permit the use of the tank wagon or trailer for transporting and spreading muck or semi-liquid manure without straw.

The present invention is not limited to the embodiment of its various component parts, but emcompasses all possible variations, in particular, as to the shape and arrangement of certain parts of the embodiment. Thus the number of rotors 4 may be different and the conveyor screw 14 for the recycling duct 13 may be replaced by a conveyor belt or other known conveying means.

Likewise the rotors 4 which in the above illustrated embodiment comprise a body of circular or polygonal cross section equipped with teeth may be of any other known type.

In order to prevent large concentrations of the substance in the field of action of the shreading rotors between two consecutive passes thereof, two plates 30 and 31 are provided having a variable surface depending on the products contained in the tank wagon or trailer, which plates are rotatably driven and constitute a rotating partition in a frontal plane which is set back more or less from the zone of rotation of the teeth of the shreading rotors. The adjustment of the set back determines the depth of the pass of the rotors in the mass of the substance. To this end, the plates are supported by the circular plate 6 by means of braces 32 which may be designed to be variable in length by an appropriate mechanical means such as sliding telescopic tubes which may be fixed in position by pins or other means, whereby the substance passing through the localized operating zone in which the shredding rotors operate fill the entire zone behind plates 30 and 31. Protrusions or relief portions 33 produced by flat sections or angle irons welded to the rear face of the plates facilitate the flow or streaming of the expanded substance towards the ejection fan comprising blades 9 welded to the circular plate 6.

In respect of liquid manure it is possible to eliminate the ejection fan.

The substance conveyed by the ejection fan is discharged as described above.

It is also possible to provide, at the end of the rotors 4, side fan blades 34 which blow the substance back towards the horizontal axis of rotation.

The cylindrical drum 11 is shifted back towards the front of the tank, behind the operating zone of the shreading rotors.

Figure 2:
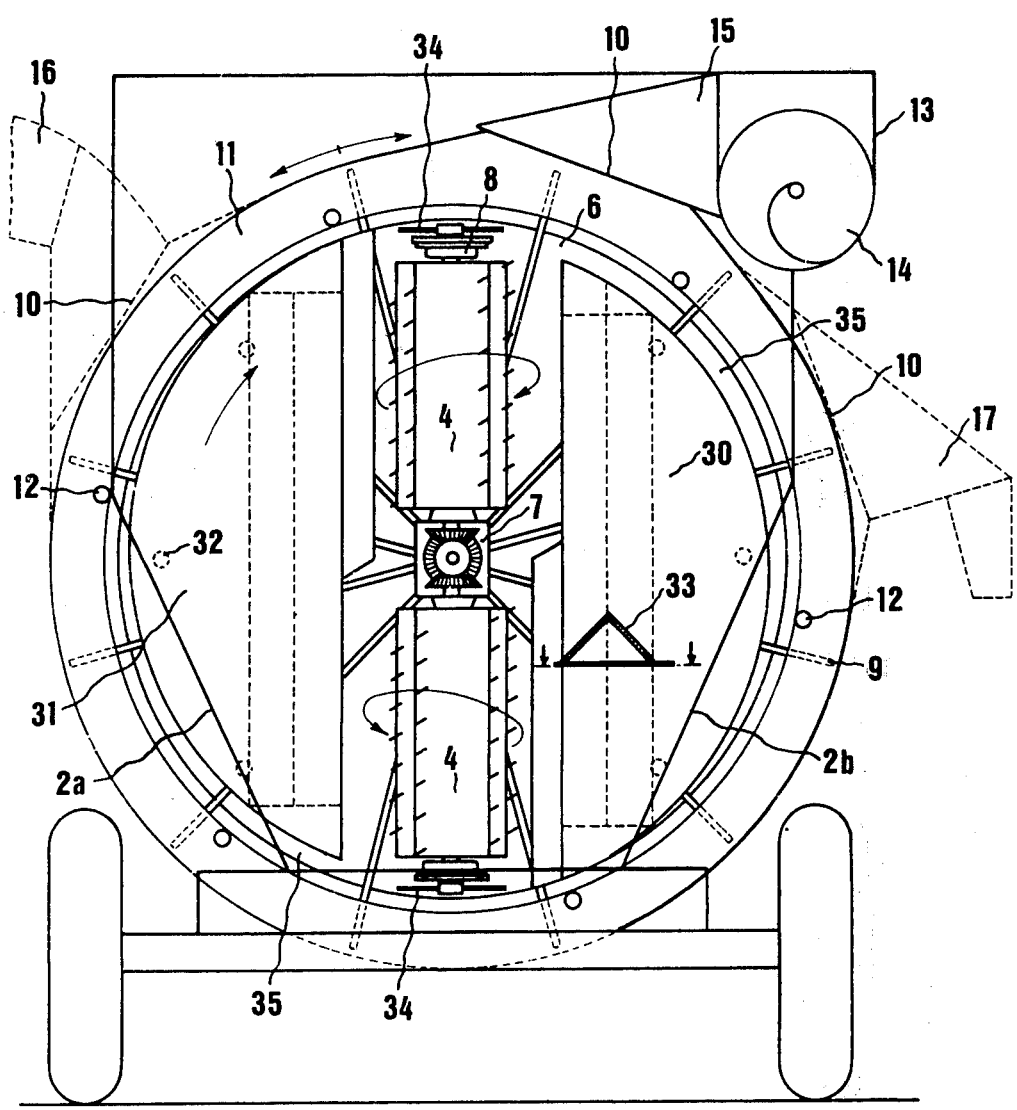
FIG. 2 is a cross-section viewed from the rear of the tank wagon or trailer in FIG. 1, with ejection into the recycling duct.
Figure 3:
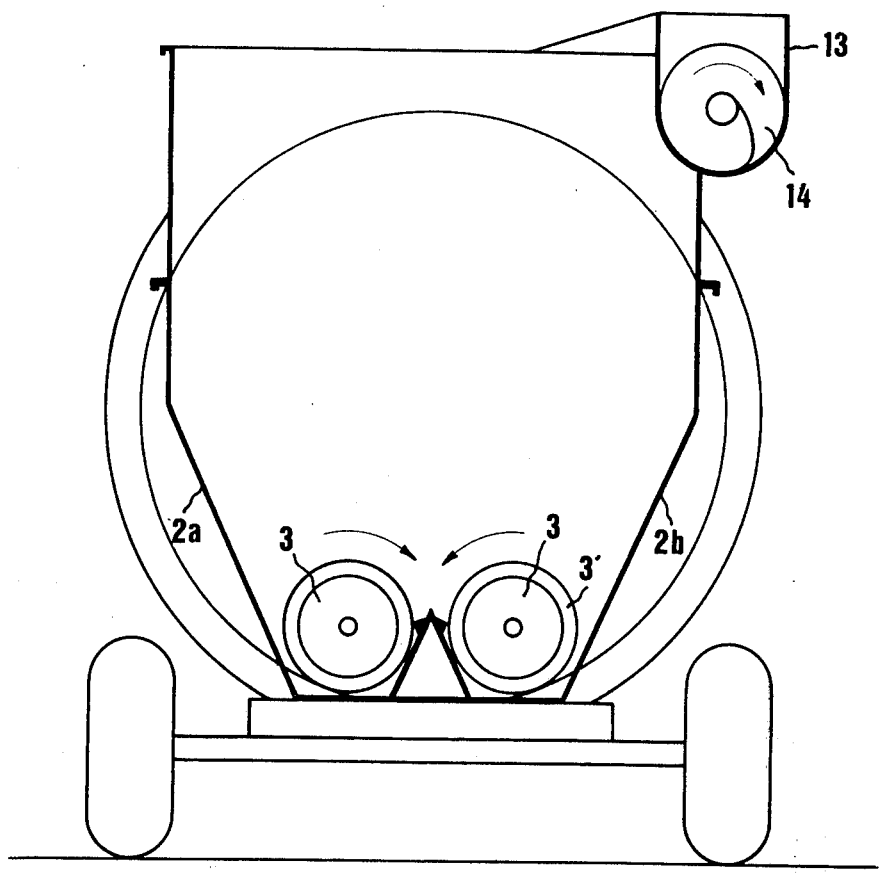
FIG. 3 is a cross-section viewed from the rear of the tank wagon or trailer.
Figure 4:
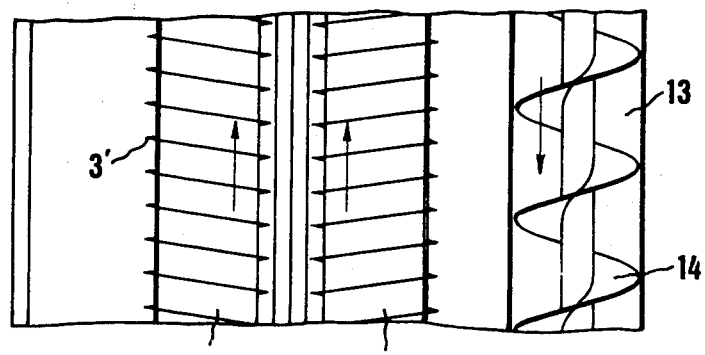
FIG. 4 is a detail in plan view of the conveyor cylinders and the recycling screw in the FIG. 3.

Plates 30 and 31 may be of any suitable form and have any shape, depending on the nature of the substance treated, their peripheral edge has a clearance in the direction of displacement in order to avoid stuffing of the substance. In FIG. 2 is shown the clearance 35, that is the variable separation between the peripheral edge of the plates 30, 31 and the drum 11.

Figure 5:
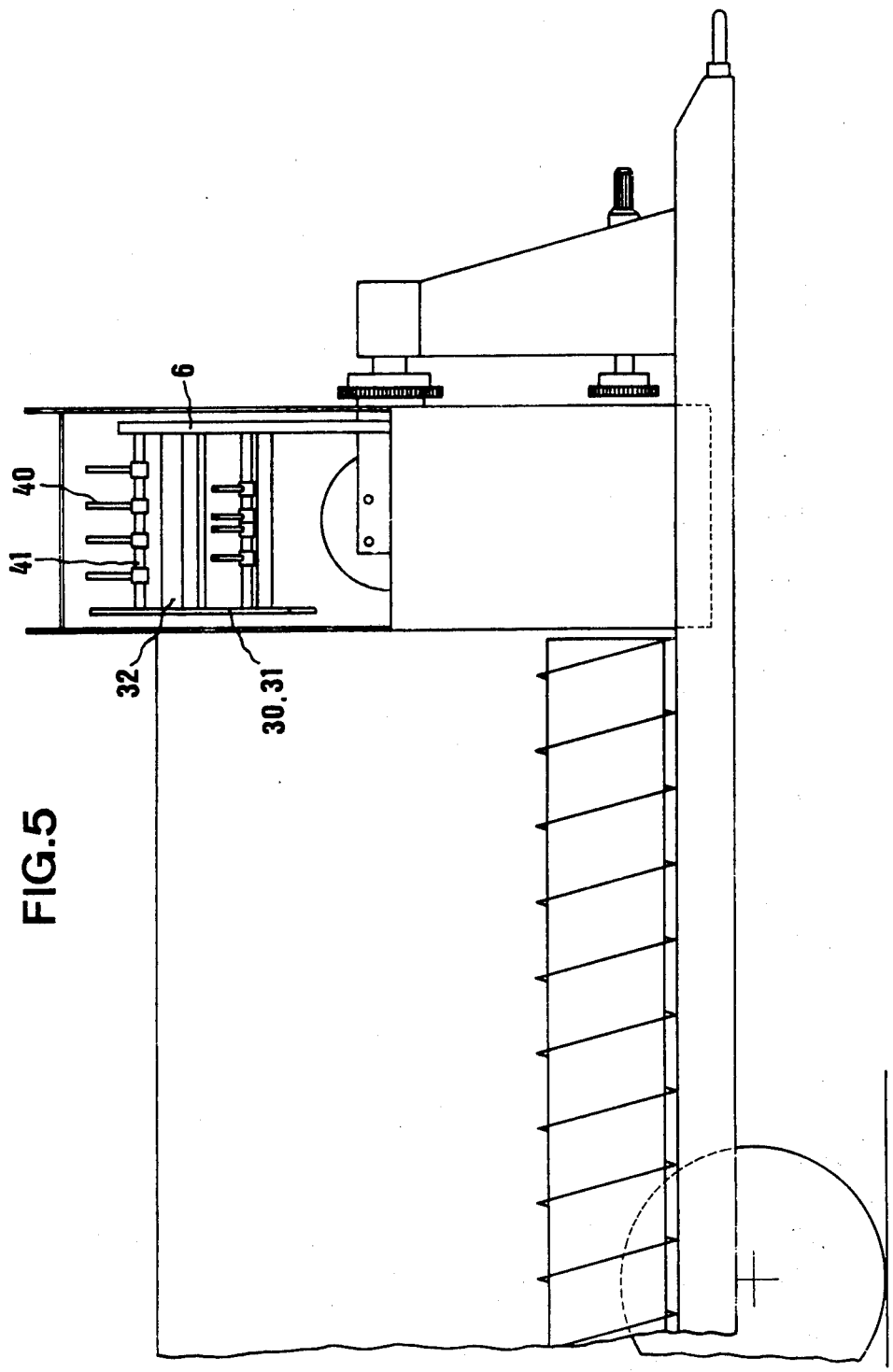
FIG. 5 is a longitudinal sectional view of a modified embodiment equipped for use as a manure spreader.
Figure 6:
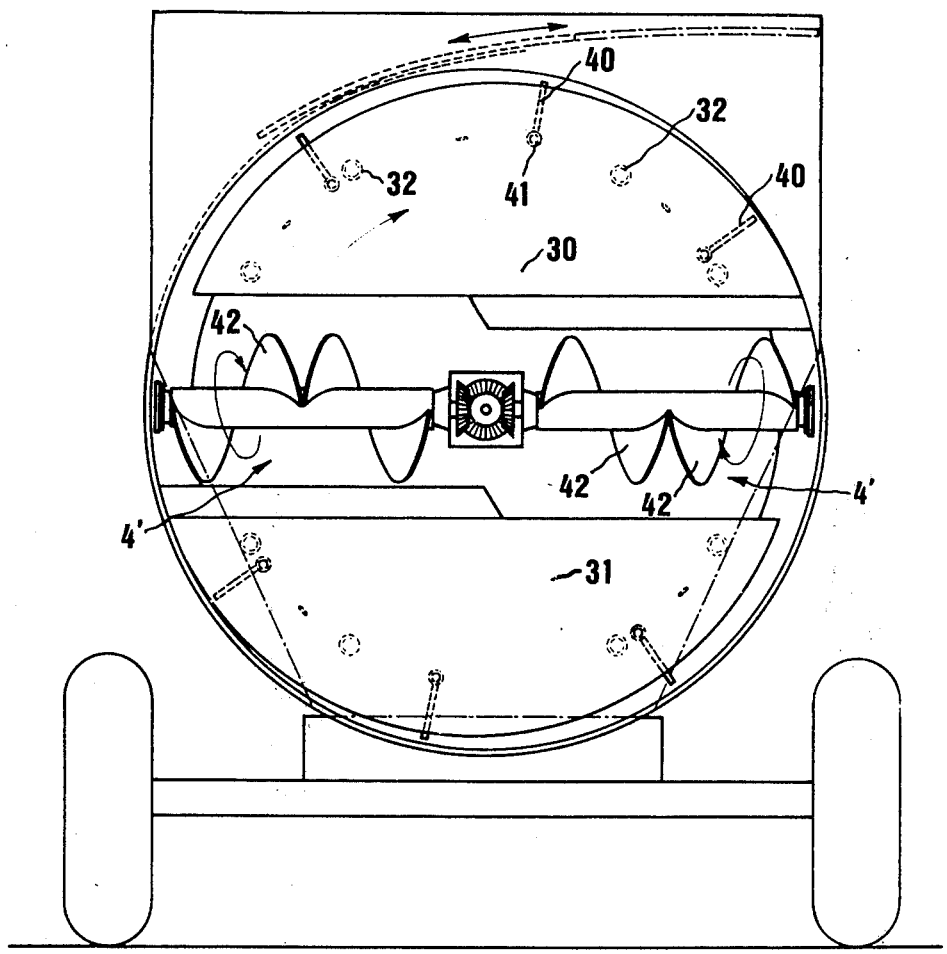
FIG. 6 is a cross-section viewed from the rear of the tank wagon in FIG. 5.

FIGS. 5 and 6 illustrate a modified embodiment of the tank wagon when used to spread manure. For this purpose it is provided with blades 40 freely mounted on the spindles 41 parallel to the braces 32 carrying the plates 30 and 31. The blades 40 are actuated by centrifugal force but may move behind an object such as a rock or stone for example.

The rotors 4' advantageously each comprise two screws 42 of opposite pitch so as to push the substance, near the center or at the periphery, toward the central annular strip.

The present tank wagon or tank trailer may also be equipped with its own device for filling it from a silo or off the ground. Furthermore, the present tank trailer has the advantage of being able to dump or spray the substance from any height thereby enabling the high level of troughs used in certain regions to be reached, and also enabling the discharge of the substance to the right or left of the tank wagon or trailer during forward or reverse motion since cattle sheds do not always have a door at each end of the feedway, this avoids a difficult maneuver.

The present tank wagon or trailer may be used for all operations related to the feeding of cattle or livestock starting with picking up fodder or the like from where it is harvested, or from a silo, shredding it, adding meal and then distributing the mixture into troughs; accordingly the present tank wagon or trailer may in fact be used as an apparatus for preparing and dispensing feed for cattle or livestock.

The present tank wagon or trailer may be placed in front of a self-loading forage wagon for permitting uniform distribution in troughs of the forage for feeding cattle or livestock.

What is claimed is:

1. A transportable tank for farm use in distributing substances, comprising a frame, a tank mounted on said frame, means within said tank for conveying the substance inside the tank longitudinally from one end to an opposite end of said tank, rotatable shredding means mounted for orbital movement in a frontal plane within said tank adjacent said opposite end, ejection fan means mounted for rotation in a frontal plane on the side of said shredding means remote from said conveying means, recyling means for conveying the substance longitudinally away from said opposite end to said one end of said tank in closed circuit with said tank, and means for selectively connecting said ejection fan means with said recycling means and with the exterior for discharging the substance laterally of the longitudinal axis thereof.

2. A transportable tank according to claim 1 adapted to dispense a cattle feed mixture containing fodder and the like as well as liquid and semi-liquid materials, wherein said conveying means comprises inwardly converging lateral walls of said tank, at least two parallel conveyor screws each comprising a cylinder and a helical strip surrounding the cylinder, said conveyor screws occupying substantially all the space between said lateral walls and being mounted for rotation in either direction for conveying the substance to the rear or the front of the tank accordingly, said helical strip being shallow relative to the diameter of said cylinder, whereby to avoid clogging of said substance about said cylinders.

3. A transportable tank according to claim 1, wherein said shredding means comprises at least one toothed rotor defining in section a closed figure, means mounting each rotor for rotation about its axis and means mounting said at least one rotor for orbital movement in a frontal plane of said tank about a horizontal axis in the longitudinal median plane of said tank, the axis of each rotor being disposed radially of said horizontal axis.

4. A transportable tank according to claim 3, further comprising a planetary bevel gear system having a fixed sun gear, each said rotor being fixed for rotation with a corresponding planet gear of said planetary system, a case for said system being fixed to a hollow shaft at the center of a circular plate for supporting said at least one rotor for orbital movement, said hollow shaft being fixed for rotation with said circular plate and adapted to be connected to a tractor power take off through transmission means, a fixed shaft extending through said hollow shaft secured to the fixed sun gear of said planetary system.

5. A transportable tank according to claim 4, wherein said ejection fan means comprises a plurality of fan blades mounted on said circular plate.

6. A transportable tank according to claim 1, wherein said means for selectively connecting comprises a cylindrical drum, a plurality of rollers disposed around the periphery of said cylindrical drum and rotatably mounting said cylindrical drum about a horizontal axis, said cylindrical drum accommodating said shredding means and said ejection fan means, said cylindrical drum having an opening through which the substance may pass, selectively to said recycling means and directly to the exterior, and means for operating one of said rollers to bring said opening in said cylindrical drum into selective communication with said recycling means and exterior.

7. A transportable tank according to claim 6, further comprising lateral deflectors on vertical side walls of said tank for guiding the substance discharged.

8. A transportable tank according to claim 6, wherein said recycling means comprises a duct (of semi-circular cross section) a conveyor screw mounted for rotation in said duct, the entire recycling means being disposed in the upper part of one to the sides of said tank and adapted to convey the substance to the rear of said tank and drop it onto said conveying means which are provided in the lower part of said tank, thereby recirculating the substance in said tank.

9. A transportable tank according to claim 6, further comprising deflector means located in the upper part of said tank for guiding the shreaded substance towards said recycling means through said opening in said cylindrical drum side wall when said ejection fan means is in communication with said recycling means through said opening.

10. A transportable tank according to claim 7, wherein said lateral deflectors are foldable for increasing or decreasing the width of the distribution zone of the discharged substance, said lateral deflectors having a fully closed position.

11. A transportable tank according to claim 3, further comprising an adjustable partition for preventing the substance from dropping back into the operating zone of said at least one rotor between two consecutive passes, thereby determining the depth of the pass of said at least one rotor in the mass of the substance in said tank.

12. A transportable tank according to claim 11, wherein said adjustable partition comprises two plates of variable surface, said adjustable partition being located in a frontal plane of said tank to each side of said at least one rotor and set back from the operating zone of said at least one rotor, the set back being variable according to the nature of the substance transported by said tank.

13. A transportable tank according to claim 12, further comprising bracing means adjustable in length, fixed between said circular plate and said adjustable partition for varying the depth of pass of said rotors.

14. A transportable tank as claimed in claim 12, wherein said plates or said adjustable partition are provided with protrusions or relief portions facing said circular plate for facilitating the flow of the substance towards said ejection fan means.

15. A transportable tank according to claim 3, wherein said fan blades are disposed at the ends of said at least one rotor for entraining the substance toward the horizontal axis.

16. A transportable tank according to claim 11, wherein said plates of said adjustable partition have a peripheral clearance with respect to said cylindrical drum to prevent stuffing.

17. A transportable tank according to claim 12, further comprising blades freely mounted about spindles parallel to the horizontal axis, said spindles being fixed between said plates of the adjustable partition and said circular plate.

18. A transportable tank according to claim 17, wherein each said rotor has screws with opposite pitches.

* * * * *